United States Patent
Kurzeja et al.

(10) Patent No.: US 6,345,826 B1
(45) Date of Patent: Feb. 12, 2002

(54) DRIVELINE ANGLE CONTROL ASSEMBLY AND METHOD FOR CONTROLLING DRIVELINE ANGLES IN A VEHICLE

(75) Inventors: Patrick Kurzeja, White Lake; Ronald N. Brissette, Lake Orion, both of MI (US); Jim Hawkins, Madison, AL (US); Chris Keeney, Troy; Christos Kyrtsos, Southfield, both of MI (US); Jack Darrin Oates, Fletcher, NC (US); Tom Sanko, Troy, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/602,533

(22) Filed: Jun. 23, 2000

(51) Int. Cl.$^7$ ............................................... B60G 17/01
(52) U.S. Cl. .................... 280/5.5; 280/5.514; 280/6.15; 701/37; 464/180
(58) Field of Search ............................. 280/5.5, 5.514, 280/6.15, 6.157, 124, 158; 701/37; 464/180

(56) References Cited

U.S. PATENT DOCUMENTS

| | | | | |
|---|---|---|---|---|
| 4,722,716 A | * | 2/1988 | Engler | |
| 4,783,089 A | * | 11/1988 | Hamilton et al. | ............. 280/5.5 |
| 4,787,650 A | * | 11/1988 | Doi et al. | ..................... 280/5.5 |
| 5,161,637 A | * | 11/1992 | Hirano et al. | |
| 5,273,308 A | * | 12/1993 | Griffiths | .............. 280/124.158 |
| 5,775,448 A | * | 7/1998 | Hirahara et al. | |
| 5,785,345 A | * | 7/1998 | Barlas et al. | ......... 280/124.158 |
| 5,877,420 A | * | 3/1999 | Moradi et al. | |
| 6,131,454 A | * | 10/2000 | Kopp et al. | |
| 6,173,974 B1 | * | 1/2001 | Raad et al. | .............. 280/5.514 |
| 6,200,240 B1 | * | 3/2001 | Oates | |

OTHER PUBLICATIONS

Printout from Internet Web Site www.4wd.sofcom.com, Apr. 2001.*

* cited by examiner

Primary Examiner—Brian L. Johnson
Assistant Examiner—Bryan Fischmann
(74) Attorney, Agent, or Firm—Carlson, Gaskey & Olds

(57) ABSTRACT

A method for automatically controlling angles in a driveline of a vehicle is disclosed. The vehicle includes an air-wide suspension system, and the driveline includes a drive shaft driven through a universal joint. The universal joint produces a rotational velocity that is detected by a sensor of a control assembly. A controller, also part of the control assembly, converts the rotational velocity into alternating rotational acceleration and deceleration of the drive shaft. Once quantified, the acceleration and deceleration of the drive shaft is compared to determine any changes in rotational acceleration. In response to any changes in rotational acceleration, the air-ride suspension system is adjusted to control the driveline angle at one end of the drive shaft such that the driveline angle at one end is balanced relative to the driveline angle at the other end of the drive shaft, and noise, vibration, fatigue, or failure of the drive shaft is reduced.

18 Claims, 4 Drawing Sheets

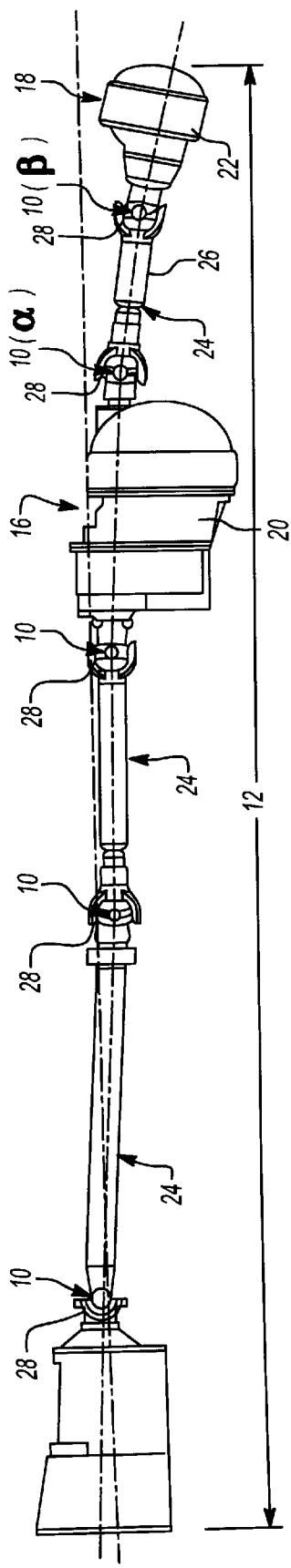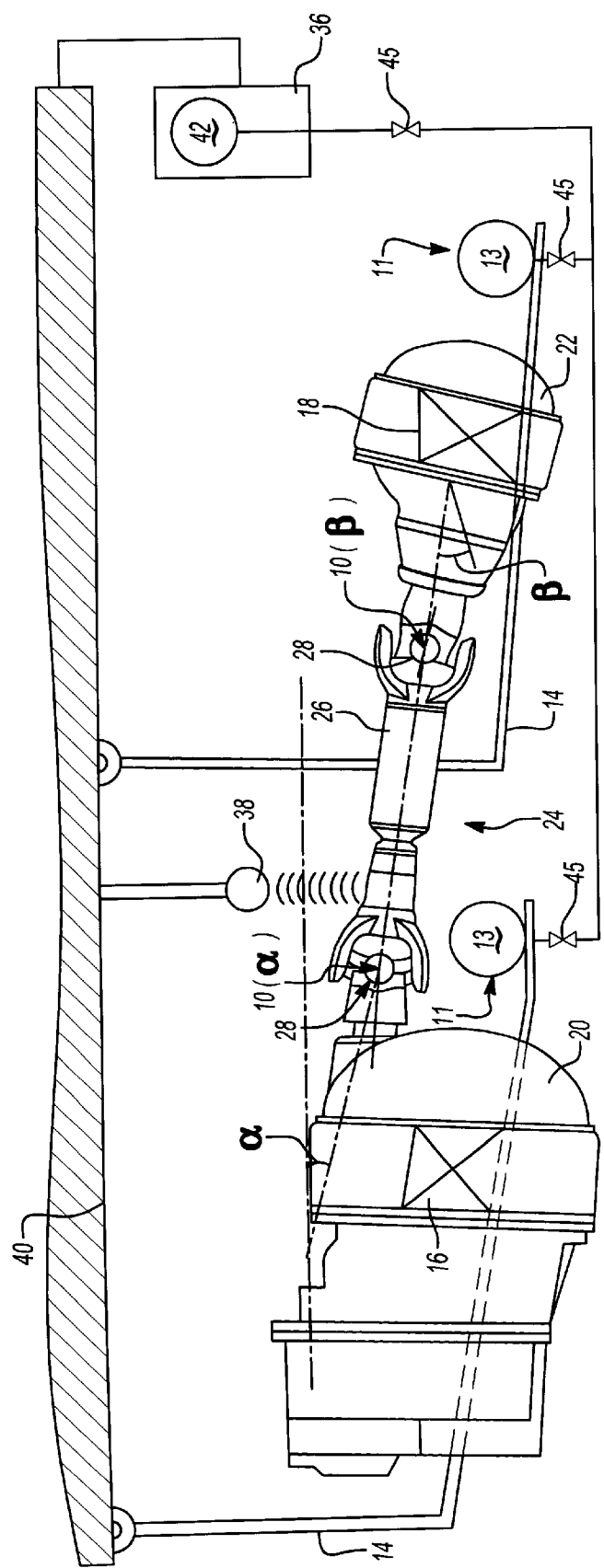

DRIVELINE ANGLE CONTROL ASSEMBLY AND METHOD FOR CONTROLLING DRIVELINE ANGLES IN A VEHICLE

BACKGROUND OF THE INVENTION

The subject invention relates to a driveline and control assembly and method for continuously controlling driveline angles in a vehicle having an adjustable suspension system, such as an air-ride suspension system, during driving of the vehicle.

Heavy-duty trucks are used for hauling trailers and/or carrying heavy loads. These trucks may include a tandem axle assembly having a forward axle and a rear axle. A drive shaft extends between the forward axle and the rear axle to transmit output from the forward axle to the rear axle to more efficiently propel the truck. This drive shaft is commonly referred to as an inter-axle shaft. These trucks may also include adjustable suspension systems, such as an air-ride suspension system, to improve ride characteristics, such as riding comfort, of the truck. Adjustable suspension systems are also commonly used for adjusting a ride height of the truck. However, adjusting the ride height of the truck is frequently detrimental to driveline angles of the truck.

Driveline angles of the inter-axle shaft between the forward axle and the rear axle are compensated for at universal joints that rotate with the inter-axle shaft at ends of the inter-axle shaft. Thus, some drivelines have universal joints at both ends. A rotational velocity of the inter-axle shaft fluctuates with changes in the driveline angle of the shaft. There is an optimum set of driveline angles at the two ends. The driveline angles change when the ride height of the truck is adjusted and may vary between 0 and 11 degrees. At set-up of the vehicle, a chassis-to-axle dimension in the suspension system establishes driveline angles. The driveline angles are not verified (i.e., it is presumed that the angles are correct). However, sometimes the suspension systems can be improperly adjusted, or can become improperly adjusted. As a result, the driveline angles at the universal joints at the ends of the inter-axle shaft may become unbalanced. It is known in the art that when the driveline angles of the inter-axle shaft at each universal joint are unbalanced, the universal joints realize inconsistent rotational velocities causing the ends of the inter-axle shaft to rotationally accelerate and decelerate at different rates. This phenomenon induces increased noise, vibration, fatigue, and failure of the inter-axle shaft, the universal joints, and other components of a driveline of the truck.

Alternatively, it is also known in the art that when the driveline angles of the inter-axle shaft at each universal joint are balanced, then the effects of rotational acceleration and deceleration caused by the unbalanced driveline angles at each universal joint are cancelled out. That is, although the inter-axle shaft may be accelerating and decelerating, this effect is not transmitted to the forward and rear axles, and the noise, vibration, fatigue, and failure are minimized or eliminated.

It would be desirable to implement a control assembly and method for controlling driveline angles that monitors the rotational acceleration and deceleration on the drive shaft output or input, and continuously and automatically adjusts the suspension system of the truck to control the driveline angles relative to a drive shaft in response to any changes in rotational acceleration of the drive shaft.

SUMMARY OF THE INVENTION AND ADVANTAGES

A driveline and control assembly for a vehicle having an adjustable suspension system and a method for continuously and automatically controlling angles of a driveline of the vehicle are disclosed. The control assembly and method monitor rotational acceleration of a drive shaft of the vehicle and operate to reduce the magnitude of any acceleration on the drive shaft by adjusting the adjustable suspension. As a result, the control assembly and method control the driveline angles between the input and output of a drive shaft while an operator is driving the vehicle by automatically adjusting the adjustable suspension system at one end of the drive shaft to adjust the relative driveline angles at each end of the drive shaft to be more in balance. This reduces, or perhaps eliminates vibrations and other problems that result from unbalanced driveline angles.

More specifically, the adjustable suspension system is preferably an air-ride suspension system, and the drive shaft is an inter-axle shaft extending between a forward axle and rear axle. The inter-axle shaft is driven by output from the forward axle through a universal joint and transmits rotation to the rear axle through another universal joint. If the angles are not balanced then, a sinusoidal rotational velocity of the inter-axle shaft is produced. The sinusoidal rotational velocity defines alternating rotational acceleration and deceleration of the inter-axle shaft. The magnitude of acceleration and deceleration of the inter-axle shaft changes in relationship to the amount of imbalance in driveline angles of the inter-axle shaft. The control assembly and method of the subject invention determine any change in the rotational acceleration, or deceleration, of the inter-axle shaft, and inflates or deflates the air-ride suspension system to change the driveline angles and reduce acceleration by moving the angles to a more balanced relationship.

Accordingly, the subject invention provides a driveline and control assembly and method that senses the rotational velocity of the inter-axle shaft and determines differences in the rotational acceleration and deceleration of the inter-axle shaft so that the control assembly can automatically adjust the suspension system of the vehicle to reduce the magnitude of any acceleration on the inter-axle shaft. To accomplish this, the control assembly controls the suspension system to adjust and balance the driveline angles at the ends of the inter-axle shaft. As a result, excessive noise, vibration, fatigue, and failure of the inter-axle shaft is prevented. Damage to drivetrain components such as axle gearing, transmission gears, synchronizer pins, and clutch fatigue is also prevented.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of a driveline of a vehicle including a drive shaft, a tandem forward axle and a tandem rear axle;

FIG. 2A is an enlarged side view of the driveline of FIG. 1 focusing on the inter-axle shaft extending between the forward and rear axles;

DETAILED DESCRIPTION OF THE PREFERRED EMBODIMENT

Figure 2B:
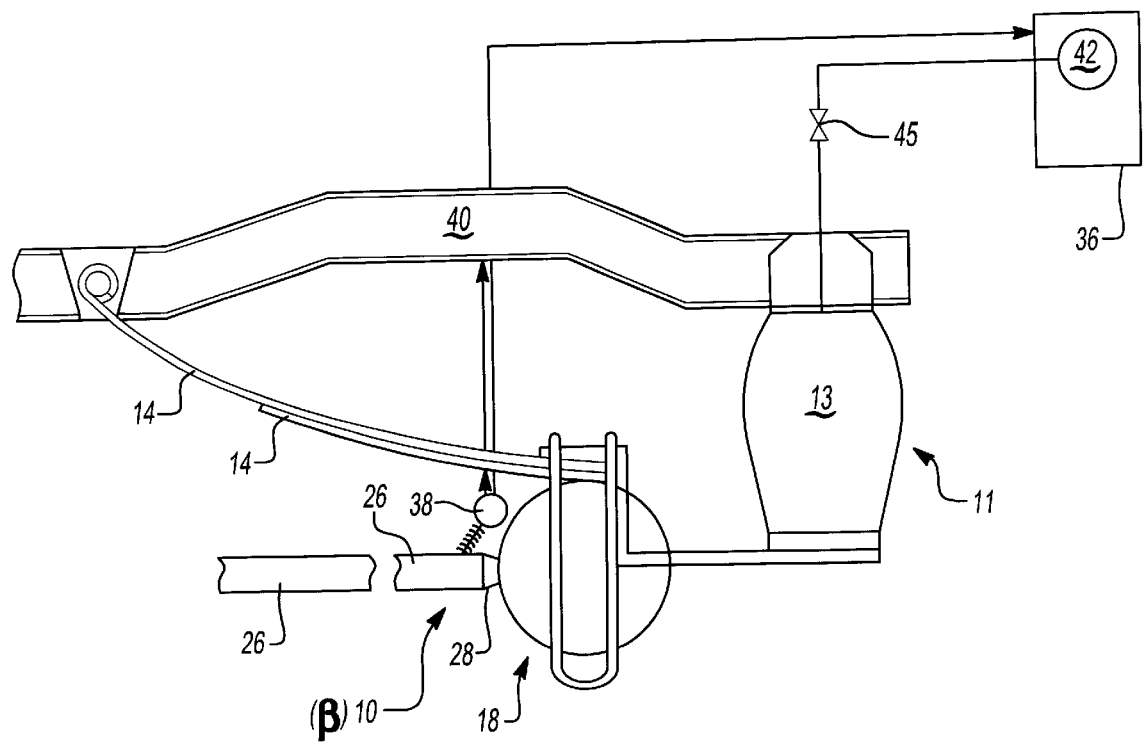
FIG. 2B is an enlarged side view of an air spring of an air-ride suspension system interacting with a frame member and the rear axle of the vehicle.

Referring to FIG. 1, a method for controlling working angles 10 of a driveline 12 of a vehicle having an adjustable suspension system 11 will be disclosed. For descriptive purposes only, the subject invention will be described below in terms of a heavy-duty truck having an air-ride suspension system 11 with air springs 13 (FIGS. 2A and 2B), a tandem forward axle 16 and a tandem rear axle 18. A forward differential assembly 20 and a rear differential assembly 22 are associated with the forward 16 and rear 18 axles, respectively. Alternatively, the subject invention may be associated with other vehicles not limited to trucks having air-ride suspension systems 11, and forward 16 and rear 18 axles without varying the scope of the subject invention.

Referring specifically to FIG. 1, the driveline 12 of the truck includes a plurality of drive shafts 24 such as an inter-axle shaft 26 extending between the forward 16 and rear 18 axles to transmit output from the forward axle 16 to the rear axle 18. The drive shafts 24, including the inter-axle shaft 26, are driven through universal joints 28. The driveline angles 10 controlled by the method of the subject invention will only be described with reference to the driveline angles α, β at the universal joints 28 associated with the inter-axle shaft 26. As such, the driveline angles α, β associated with the inter-axle shaft 26 are defined as the angle between the driveline 12 and the forward differential assembly 20, and the angle between the driveline 12 and the rear differential assembly 22. The subject invention can also be applied to the driveline angles 10 associated with the other drive shafts 24 of the driveline 12 shown in FIG. 1.

Referring to FIGS. 2A and 2B, the air springs 13 are in connection with the forward 16 and rear 18 axles through a frame 40 of the truck. As shown schematically in FIG. 2B, the air springs 13 are mounted to a suspension member 14 which is pivotally connected to the truck frame 40. The suspension member 14 is also fixed to the axle 18. It should be understood that dozens of different suspension systems are used to position and support the axle. This invention extends to all such systems.

When the air springs 13 are adjusted (inflated or deflated), the forward 16 and rear 18 axles are displaced relative to the frame member 40 of the truck and the driveline angles α, β at each end of the inter-axle shaft 26 are affected.

The inventive method determines a change in rotational acceleration 32 of the inter-axle shaft 26, and adjusts the suspension system 11 to control the driveline angles α, β in response to any change in rotational acceleration 32. As a result of adjusting the suspension system 11, the acceleration 32 on the inter-axle shaft 26, if any, is moved toward a zero acceleration value on an iterative basis. This method will be described in greater detail hereinbelow.

Figure 3:
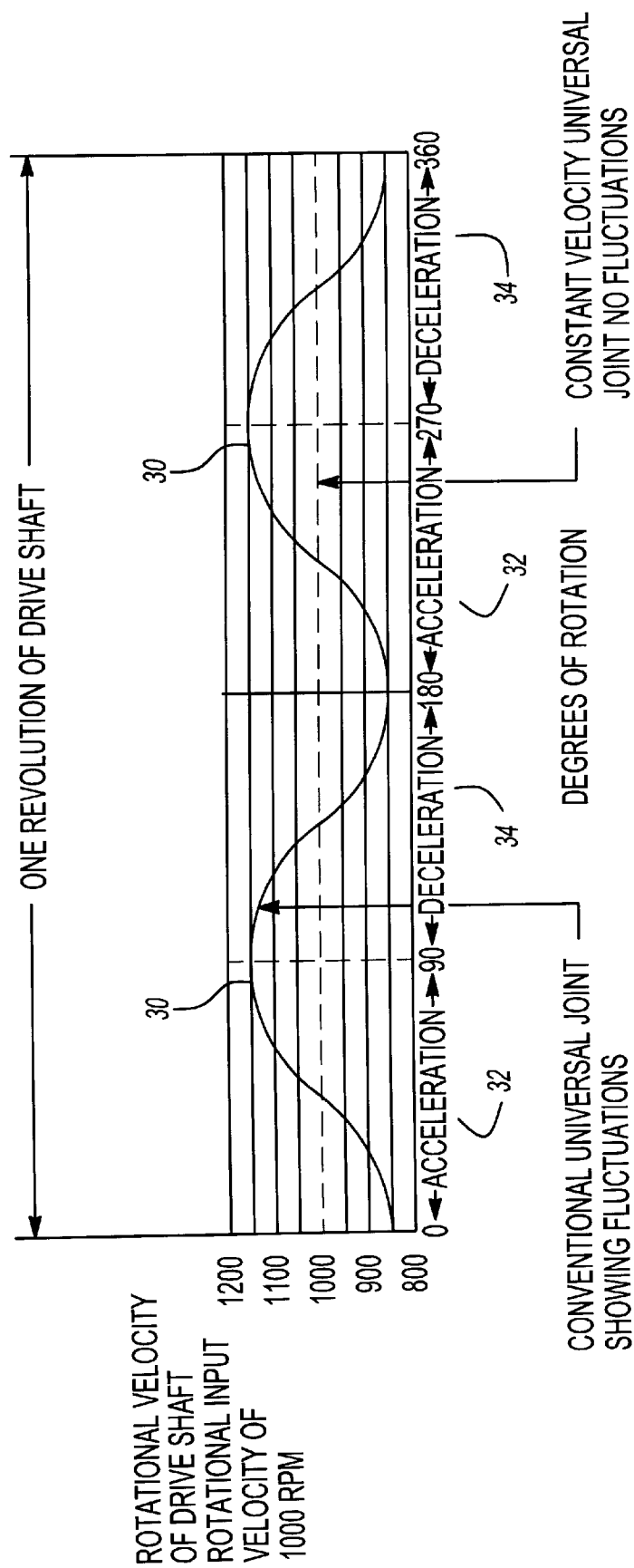
FIG. 3 is a graph of rotational velocity of the drive shaft of the vehicle varying with the driveline angle of the drive shaft to define rotational acceleration and deceleration.
Figure 4:
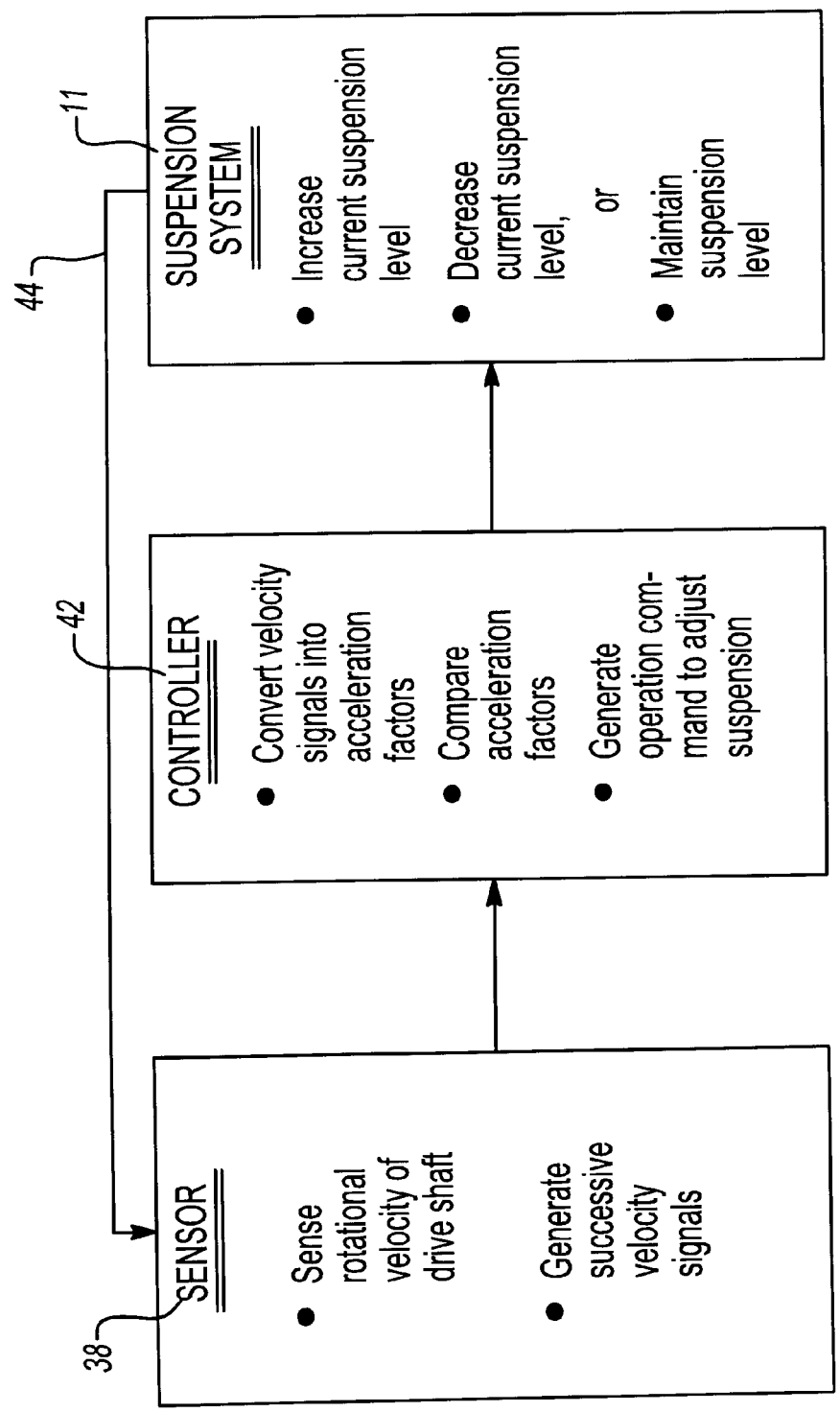
FIG. 4 is a flow diagram schematically detailing a method for controlling driveline angles in a vehicle.

Referring now to FIGS. 3 and 4, the inter-axle shaft 26 will exhibit a sinusoidal rotational velocity 30 if the angles α, β at its two ends are not balanced. The sinusoidal rotational velocity 30 of the inter-axle shaft 26 defines alternating rotational acceleration 32 and deceleration 34 of the inter-axle shaft 26. This sinusoidal relationship is inherent in a shaft driven through a universal joint where the angles at its ends are not balanced. For descriptive purposes, rotational acceleration 32 will be used below to describe both rotational acceleration 32 and rotational deceleration 34 (negative acceleration). With the rotational acceleration 32, 34 of the inter-axle shaft 26 quantified, the change in rotational acceleration 32, 34 of the inter-axle shaft 26 can be evaluated. The steps are described in the flow diagram of FIG. 4.

The step of determining the change in rotational acceleration 32, 34 of the inter-axle shaft 26 first includes the step of sensing (refer to FIG. 4) rotational velocity 30 of the inter-axle shaft 26. The rotational velocity 30 of the inter-axle shaft 26 is preferably sensed near the universal joints 28 that are associated with the inter-axle shaft 26. A control assembly 36, shown schematically, includes a sensor 38 that senses the rotational velocity 30 of the inter-axle shaft 26. As shown in FIG. 2, the sensor 38 is positioned external to the control assembly 36. Alternatively, the control assembly 36 may be positioned under the vehicle such that the sensor 38 is part of the control assembly 36. The control assembly 36 can selectively control the sensor 38 to sense the rotational velocity 30 of the inter-axle shaft 26 at predetermined periodic time intervals (e.g. every 15 seconds), or to sense the rotational velocity 30 continuously over time.

In a preferred embodiment, the sensor 38 is a proximity sensor mounted to the frame member 40 of the truck or to the axles 16 or 18. In such an embodiment, the proximity sensor is disposed above the shaft 26 near either universal joint 28 associated with the inter-axle shaft 26. Note that, in the subject invention, there is no need to sense the rotational velocity 30 of the inter-axle shaft 26 adjacent both universal joints 28 associated with the inter-axle shaft 26 because the suspension system 11 can be adjusted to balance both driveline angles α, β in response to the rotational velocity 30 adjacent one universal joint 28 and by adjusting one of the angles α, β. Also, sensors other than proximity sensors may be utilized and mounted to other components the truck without varying the scope of the subject invention. These other sensor may even sense the rotational velocity 30 of the inter-axle shaft 26 at locations other than adjacent a universal joint 28.

Successive velocity signals indicative of the rotational velocity 30 of the inter-axle shaft 26 are generated as the sensor 38 senses the rotational velocity 30. These velocity signals are sent to a controller 42 included in the control assembly 36. The controller 42 receives these velocity signals and proceeds to convert the successive velocity signals into successive acceleration factors indicative of the rotational acceleration 32, 34 of the inter-axle shaft 26. The successive velocity signals and the successive acceleration factors permit the control assembly 36 to operate on an iterative basis. The subject invention incorporates a standard analog program to differentiate the successive velocity signals into the successive acceleration factors. However, other control programs may be used.

To determine the change in rotational acceleration 32, 34, the controller 42 proceeds to compare at least one subsequent acceleration factor to at least one previous acceleration factor. The controller 42 performs this comparison to determine when the subsequent acceleration factor is greater than or less than the previous acceleration factor. That is, the controller 42 'looks' to see if the most recent acceleration factor is different from the immediately proceeding acceleration factor. If, after the comparison, the controller 42 determines that the subsequent acceleration factor is greater than or less than the previous acceleration factor, then the controller 42 generates an operation command to adjust the suspension system 11 of the truck, and the suspension system 11 is adjusted. As should be appreciated, in practice, it may be that adjustment is only commanded when the difference or the magnitude of acceleration exceeds a predefined limit.

The operation command signals the suspension system 11 of the truck to either increase or decrease a current suspension level. As a result, the suspension system 11 of the truck is adjusted which changes the position of at least one of the axles 16, 18 which affects the driveline angles α, β. This change is made in response to the change in rotational acceleration 32, 34 of the inter-axle shaft 26 where the change in rotational acceleration 32, 34 is quantified by the difference, if any, between the subsequent acceleration factor and the previous acceleration factor.

Alternatively, if the controller 42 determines that the subsequent acceleration factor is at the zero acceleration value, or that the difference is below a limit, then an operation command is not generated as there is no need to adjust the suspension system 11 of the truck. That is, the driveline angles are already optimized and vibration does not exist. To continuously adjust and control the suspension system 11, the sensor 38 repeatedly senses the rotational velocity 30 and the controller 42 generates successive operation commands for each comparison of acceleration factors. As a result, the subject invention establishes a feedback loop for continuously and automatically controlling the driveline angles α, β.

In operation, if in a first comparison, the most recent acceleration factor is different (i.e. greater than or less than) from the immediately preceding acceleration factor, then the controller 42 responds by generating the first operation command to increase or decrease the current suspension level. For reasons that will be understood below, it is not critical whether the first operation command is to increase the suspension level or to decrease the suspension level. If in a subsequent second comparison, the new most recent acceleration factor is less than the immediately preceding acceleration factor (i.e. the most recent acceleration factor from the first comparison), then the controller 42 responds by repeating the previous operation command. That is, if the operation command generated in the first comparison was to increase the current suspension level, then the operation command resulting from the second comparison will also be to increase the suspension level because the controller 42 'recognizes' that the previous operation command was a proper command as the new most recent acceleration factor is closer to the zero acceleration value.

Alternatively, if in the subsequent second comparison, the new most recent acceleration factor is greater than the immediately preceding acceleration factor, then the controller 42 responds by reversing the operation command of the first comparison. That is, if the operation command generated in the first comparison was to increase the current suspension level, then the operation command resulting from the second comparison will be to decrease the suspension level because the controller 42 'recognizes' that the previous operation command was an improper command as the new most recent acceleration factor is further away from the zero acceleration value. Similarly, if the operation command generated in the first comparison was to decrease the current suspension level, then the operation command resulting from the second comparison will be to increase the current suspension level.

Finally, if in the subsequent second comparison, the new most recent acceleration factor is equal to the immediately preceding acceleration factor and the factor is not zero, then the controller 42 will generate another operation command as the previous command, whatever it was, had no impact on moving the acceleration of the inter-axle shaft toward zero. If in the case where the acceleration factor is zero and in the subsequent comparison the acceleration factor is still zero, then the controller 42 does not generate an operation command as the current suspension level, whatever it is, is simply maintained.

In the case where the suspension system 11 of the truck is specifically the air-ride suspension, the controller 42 generates the operation command to inflate or deflate the air springs 13 when the subsequent acceleration factor is greater than or less than the previous acceleration factor. More specifically, when the subsequent acceleration factor is greater than or less than the previous acceleration factor, the controller 42 actuates pneumatic control valves 45 that modify inflation levels in the air springs 13. It is known in the art that there is an air spring 13 associated with each of the axles 16, 18 and thus with each end of the inter-axle shaft 26. As a result, in subsequent comparisons, when the new most recent acceleration factor is greater than the immediately preceding acceleration factor, then the controller 42 has two options. As stated above, the controller 42 can generate a reversed operation command that adjusts the air spring 13 at the end of the inter-axle shaft 26 where the rotational velocity 30 is being sensed. Alternatively, the controller 42 can modify the inflation level in the air spring 13 at the other end of the inter-axle shaft 26. Since the driveline angles α, β are relative to one another, adjusting the air spring 13 at the end of the inter-axle shaft 26 where the rotational velocity is not being sensed by the sensor 38 has a detectable impact at the end of the inter-axle shaft 26 that is being sensed by the sensor 38.

Referring to FIGS. 2A and 2B, it is to be understood that the control assembly 36, including the sensor 38 and the controller 42, and the adjustable suspension system 11, including the air springs 13, are shown highly schematically and may be arranged in a manner other than as shown.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for controlling an angle of a driveline of a vehicle having an adjustable suspension system wherein the driveline includes a drive shaft driven through a universal joint that produces a sinusoidal rotational velocity defining alternating rotational acceleration and deceleration of the drive shaft in response to a rotational input velocity wherein the rotational acceleration and deceleration of the drive shaft change in relationship to the driveline angle, said method comprising the steps of:

determining a rotational acceleration of the drive shaft; and adjusting the suspension system to control the driveline angle in response to the rotational acceleration.

2. A method as set forth in claim 1 wherein the step of determining rotational acceleration is further defined by sensing the rotational velocity of the drive shaft.

3. A method as set forth in claim 2 wherein the step of sensing the rotational velocity of the drive shaft is further defined by sensing the rotational velocity at predetermined periodic time intervals.

4. A method as set forth in claim 2 wherein the step of sensing the rotational velocity of the drive shaft is further defined by sensing the rotational velocity continuously over time.

5. A method as set forth in claim 2 wherein the step of sensing the rotational velocity of the drive shaft is further defined by sensing the rotational velocity adjacent the universal joint that drives the drive shaft.

6. A method as set forth in claim 2 wherein the rotational velocity of the drive shaft is sensed with a proximity sensor.

7. A method as set forth in claim 2 wherein the step of determining rotational acceleration is further defined by generating successive velocity signals indicative of the rotational velocity of the drive shaft and sending the successive velocity signals to a controller.

8. A method as set forth in claim 7 wherein the step of determining rotational acceleration is further defined by converting the successive velocity signals into successive acceleration factors indicative of the rotational acceleration of the drive shaft.

9. A method as set forth in claim 8 wherein the step of determining a change in rotational acceleration is further defined by comparing at least one subsequent acceleration factor to at least one previous acceleration factor to determine when the subsequent acceleration factor is greater than or less than the previous acceleration factor.

10. A method as set forth in claim 9 further including the step of generating an operation command to adjust the suspension system of the vehicle when the subsequent acceleration factor is greater than a predetermined amount.

11. A method as set forth in claim 10 further including the step of generating successive operation commands to continuously adjust and control the suspension system for each comparison of at least one subsequent acceleration factor to at least one previous acceleration factor.

12. A method as set forth in claim 1 wherein the suspension system of the vehicle is an air-ride suspension system having air springs.

13. A method as set forth in claim 12 wherein the step of adjusting the suspension system to control the driveline angle is further defined by modifying inflation levels in air springs of the air-ride suspension system when the subsequent acceleration factor is greater than a predetermined amount.

14. A method for controlling an angle of a driveline of a vehicle having an adjustable suspension system wherein the driveline includes a drive shaft driven by a universal joint that produces a sinusoidal rotational velocity defining alternating rotational acceleration and deceleration of the drive shaft in response to a rotational input velocity wherein the rotational acceleration and deceleration of the drive shaft change in relationship to the driveline angle, said method comprising the steps of:

sensing the rotational velocity of the drive shaft;

generating successive velocity signals indicative of the rotational velocity of the drive shaft and sending the successive velocity signals to a controller;

converting the successive velocity signals into successive acceleration factors indicative of the rotational acceleration of the drive shaft;

comparing at least one subsequent acceleration factor to at least one previous acceleration factor to determine a change in rotational acceleration; and adjusting the suspension system to control the driveline angle in response to the change in rotational acceleration of the drive shaft.

15. A driveline and control assembly for controlling driveline angles of a vehicle, said assembly comprising:

a driveline including a drive shaft;

first and second universal joints at ends of the drive shaft;

an adjustable suspension system supporting a drive axle of the vehicle for changing the driveline angles of the drive shaft;

a sensor for sensing a rotational velocity of the drive shaft and for generating successive velocity signals indicative of the rotational velocity of the drive shaft; and a controller communicating with said sensor for determining rotational acceleration of the drive shaft and for adjusting the suspension system to control the driveline angle in response to the rotational acceleration of the drive shaft.

16. A driveline and control assembly as set forth in claim 15 wherein an air spring is adjusted by said controller.

17. A driveline and control assembly as set forth in claim 15 wherein said controller receives said successive velocity signals and converts said successive velocity signals into successive acceleration factors indicative of the rotational acceleration of the drive shaft.

18. A driveline and control assembly as set forth in claim 17 wherein said controller compares at least one subsequent acceleration factor to at least one previous acceleration factor to determine a change in rotational acceleration.

* * * * *